United States Patent
Fleureau et al.

(10) Patent No.: US 12,356,006 B2
(45) Date of Patent: Jul. 8, 2025

(54) METHOD AND APPARATUS FOR ENCODING VOLUMETRIC VIDEO REPRESENTED AS A MULTIPLANE IMAGE

(71) Applicant: InterDigital CE Patent Holdings, SAS, Paris (FR)

(72) Inventors: Julien Fleureau, Rennes (FR); Renaud Dore, Rennes (FR); Bertrand Chupeau, Rennes (FR); Thierry Tapie, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 128 days.

(21) Appl. No.: 18/027,754

(22) PCT Filed: Sep. 16, 2021

(86) PCT No.: PCT/EP2021/075425
§ 371 (c)(1),
(2) Date: Mar. 22, 2023

(87) PCT Pub. No.: WO2022/063664
PCT Pub. Date: Mar. 31, 2022

(65) Prior Publication Data
US 2023/0379495 A1    Nov. 23, 2023

(30) Foreign Application Priority Data
Sep. 22, 2020   (EP) .................................. 20306076

(51) Int. Cl.
*H04N 19/597*     (2014.01)
*G06T 3/053*      (2024.01)
(Continued)

(52) U.S. Cl.
CPC .......... *H04N 19/597* (2014.11); *G06T 3/053* (2024.01); *G06T 17/00* (2013.01); *H04N 19/124* (2014.11);
(Continued)

(58) Field of Classification Search
None
See application file for complete search history.

(56) References Cited

U.S. PATENT DOCUMENTS

2012/0020549 A1 *  1/2012  Lee ........................ H04N 19/61
                                                    382/154
2017/0188002 A1 *  6/2017  Chan .................... H04N 13/122
(Continued)

FOREIGN PATENT DOCUMENTS

EP    3554074 A1 * 10/2019    ........... H04N 19/124
GB    2572996 A     10/2019

OTHER PUBLICATIONS

Anonymous, "Test model 4 for Immersive video", International Organization for Standardization, Coding of Moving Pictures and Audio, ISO/IEC JTC 1/SC 29/WG 11, Document: N19002, Brussels, Belgium, Jan. 2020, 45 pages.
(Continued)

Primary Examiner — Tyler W. Sullivan
(74) Attorney, Agent, or Firm — Condo Roccia Koptiw LLP

(57) ABSTRACT

A method and a device for generating a data stream representative of a volumetric video generated from a sequence of multi-plane images are disclosed. A quantization law depending on an angular resolution used to generate patches from the multi-plane images is set up. For each intra-periods of the frame sequence, patches are generated for a given angular resolution. If generated patches do not fit in atlas images of a target size, the angular resolution is decreased
(Continued)

and patches are generated again according to this new angular resolution.

12 Claims, 4 Drawing Sheets

(51) Int. Cl.
*G06T 17/00* (2006.01)
*H04N 19/124* (2014.01)
*H04N 19/126* (2014.01)

(52) U.S. Cl.
CPC ........ *H04N 19/126* (2014.11); *G06T 2200/16* (2013.01)

(56) References Cited

U.S. PATENT DOCUMENTS

2020/0111237 A1* 4/2020 Tourapis .............. H04N 19/597
2021/0192796 A1* 6/2021 Aflaki Beni .............. G06T 9/40
2023/0362409 A1* 11/2023 Chupeau .............. G06V 10/762

OTHER PUBLICATIONS

Thudor et al., "Interdigital CE-1.1.2 experiment", International Organization for Standardization, Coding of Moving Pictures and Audio, ISO/IEC JTC 1/SC 29/WG 11, Document: MPEG2020/m54419, MPEG131 online, Jul. 2020, 12 pages.

Graziosi et al., "An overview of ongoing point cloud compression standardization activities: video-based (V-PCC) and geometry-based (G-PCC)", Asia Pacific Signal and Information Processing Association (APSIPA), Transactions on Signal and Information Processing, vol. 9, e13, Apr. 3, 2020, 17 pages.

Zhou et al., "Stereo Magnification: Learning View Synthesis using Multiplane Images", Association for Computing Machinery, ACM Transactions on Graphics, vol. 37, Issue 4, Article 65, Aug. 2018, 12 pages.

De Rivaz et al., "AV1 Bitstream & Decoding Process Specification", The Alliance for Open Media, Version 1.0.0, Jun. 25, 2018, 677 pages.

Ochotta et al., "Image-Based Surface Compression", Computer Science, Computer Graphics Forum, vol. 27, Issue No. 6, Sep. 1, 2008, 15 pages.

Anonymous, "Terminal Equipment and Protocols for Telematic Services", Information Technology—Digital Compression and Coding of Continuous-Tone Still images—Requirements and Guidelines, International Telecommunication Union (ITU), The International Telegraph and Telephone Consultative Committee (CCITT), Document: T.81, Sep. 1992, 186 pages.

Anonymous, "Information Technology—Coding of Audio-Visual Objects—Part 10: Advanced Video Coding", International Standard, ISO/IEC 14496-10, Second Edition, Oct. 1, 2004, 280 pages.

ITU_T, "Advanced video coding for generic audiovisual services", ITU-T H.264, International Telecommunication Union, ITU-T Telecommunication Standardization Sector of ITU, Series H: Audiovisual and Multimedia Systems, Infrastructure of Audiovisual Services—Coding of Moving Video, Jan. 2012, pp. 1-680.

ITU-T, "High Efficiency Video Coding", Recommendation ITU-T H.265, Series H: Audiovisual and Multimedia Systems, Infrastructure of Audiovisual Services—Coding of Moving Video, Oct. 2014, 540 pages.

Anonymous, "High Efficiency Video Coding", ITU-T Telecommunication Standardization Sector of Itu, Series H: Audiovisual and Multimedia Systems, Infrastructure of audiovisual services—Coding of moving video, Recommendation ITU-T H.265, Feb. 2018, pp. 1-692.

Grange, et al., "VP9 Bitstream & Decoding Process Specification", Version 0.6, Mar. 31, 2016, 171 pages.

* cited by examiner

METHOD AND APPARATUS FOR ENCODING VOLUMETRIC VIDEO REPRESENTED AS A MULTIPLANE IMAGE

This application is a U.S. National Stage Application under 35 U.S.C. § 371 of International Patent Application No. PCT/EP2021/075425, filed Sep. 16, 2021, which is incorporated herein by reference.

This application claims priority to European Application No. 20306076.9, filed Sep. 22, 2020, which is incorporated herein by reference in its entirety.

1. TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD). The present principles particularly relate to the encoding and decoding of volumetric scenes as a multi-plane image.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A multiplane image (MPI) is a layered representation of a volumetric scene where each layer is actually a slice of the 3D space of the scene. Each slice is sampled according to an underlying central projection (e.g. perspective, spherical, . . . ) and a sampling law which defines the interlayer spacing. A layer comprises color as well as transparency information of any 3D intersecting object of the scene. From this sliced representation, it is possible to recover/synthesize any viewpoint located in a limited region around the center of the underlying projection. It can be performed making use of efficient algorithms (e.g. "reversed" Painter's algorithm) which blend each layer with the proper weights (i.e. transparency) starting from the nearest to the furthest layer. Such techniques may run much faster than other known view synthesis processes.

The way the transparency weights are computed as well as the number of slices chosen for the representation condition the quality of the view synthesis. When these parameters are properly chosen, an MPI-based view synthesis process allows for "smooth" representations of objects borders and in a more general manner better robustness to contour and geometry artifacts than other view synthesis algorithms. Encoding a MPI may require a large amount of data as each layer is a full size four component image (i.e. three components for color and one for transparency).

A way to encode volumetric scenes is to pack samples of projected parts of the scene (called patches) into a large image (called (patch) atlas). It is possible to encode a MPI as a patch atlas. However, such a representation tends to require bigger atlases than other representation of the volumetric scene. Mechanisms to control actively the pixel rate of the MPI-based atlases with attractive perceptual properties are missing.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate to a method comprising, for a multi-plane image representative of a three-dimensional scene and for a size of an atlas image:
  generating patches by aggregating not totally transparent parts of the multi-plane image and by using a quantization law depending on an angular resolution; and
  on condition that packing the generated patches in an atlas image of said size fails, decreasing the angular resolution and iterating the generating of the patches.

The present principles also relate to a method for generating a sequence of atlas images from a sequence of multi-plane images according to one of claims 1 to 4, wherein the generated sequence of atlas images is encoded as an intra-period of a video stream.

The present principles also relate to a device comprising a processor configured to, for a multi-plane image representative of a three-dimensional scene and for a size of an atlas image:
  generate patches by aggregating non totally transparent parts of the multi-plane image and by using a quantization law depending on an angular resolution;
  on condition that packing the generated patches in an atlas image of the size fails, decrease the angular resolution and iterate the generating of the patches.

4. BRIEF DESCRIPTION OF DRAWINGS

The present disclosure will be better understood, and other specific features and advantages will emerge upon reading the following description, the description making reference to the annexed drawings wherein.

Figure 5:
Figure 6:
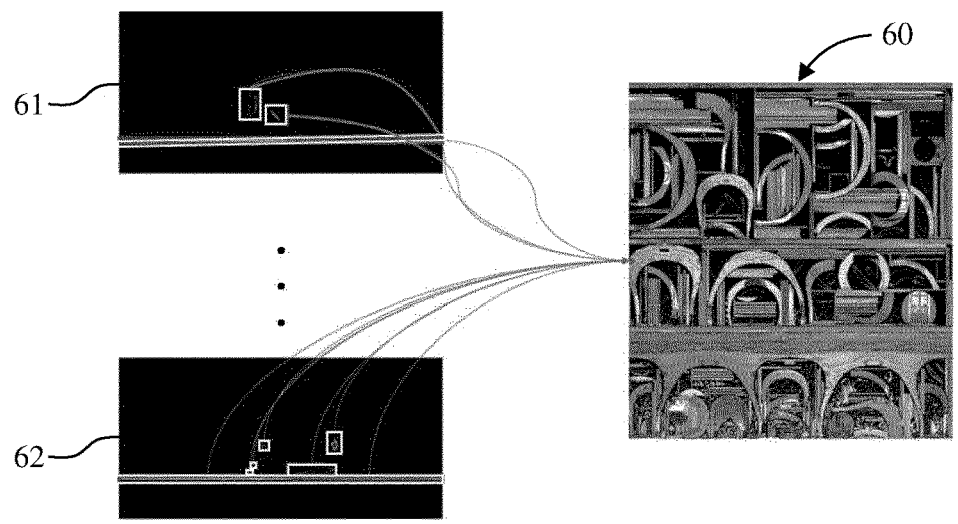
Figure 7:
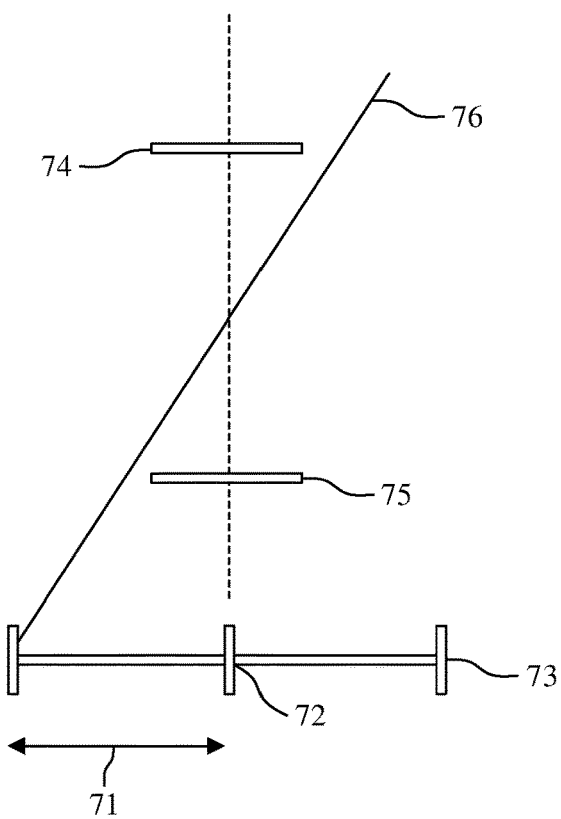
Figure 8:
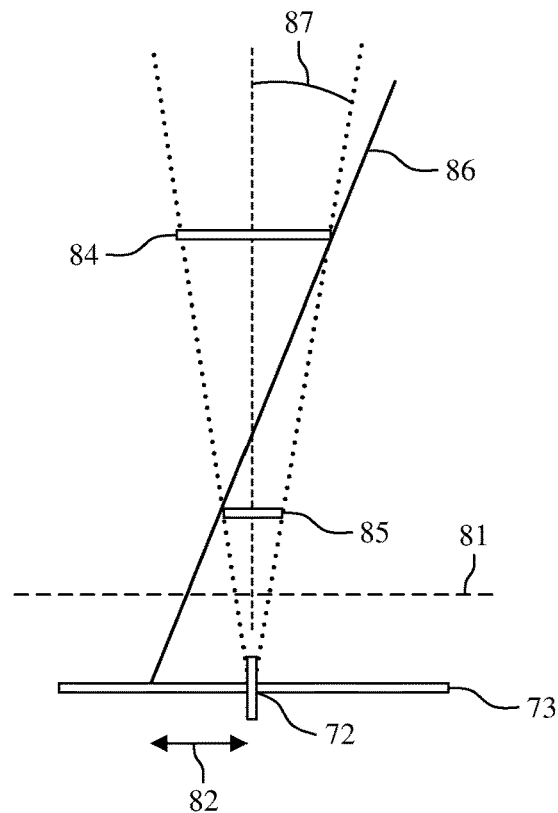
Figure 9:
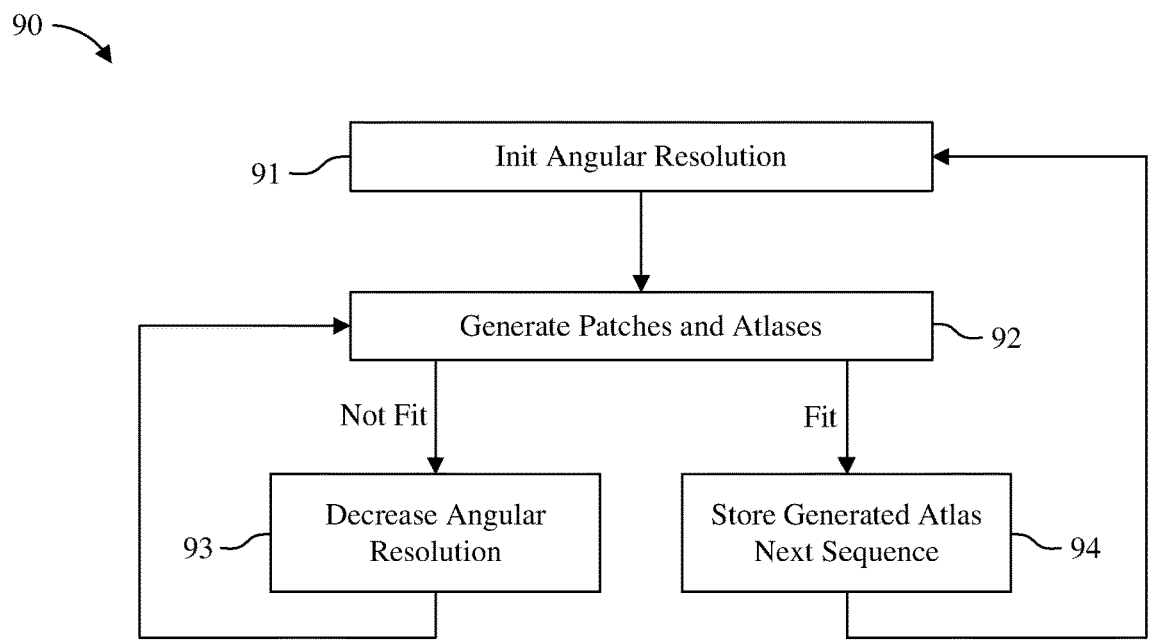

FIG. 5 a representation of a volumetric scene sliced in layers according to a spherical projection, according to a non-limiting embodiment of the present principles;

FIG. 6 illustrates the conversion of a video MPI to MIV-like atlases, according to a non-limiting embodiment of the present principles;

FIG. 7 illustrates a perceptually founded quantization law according to a first aspect of the present principles;

FIG. 8 provides technical details on the principles developed in relation to FIG. 7, according to a non-limiting embodiment of the present principles;

FIG. 9 illustrates a method for generating a sequence of MPI-based atlases representative of a volumetric video, according to a non-limiting embodiment of the present principles;

5. DETAILED DESCRIPTION OF EMBODIMENTS

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

Figure 1:
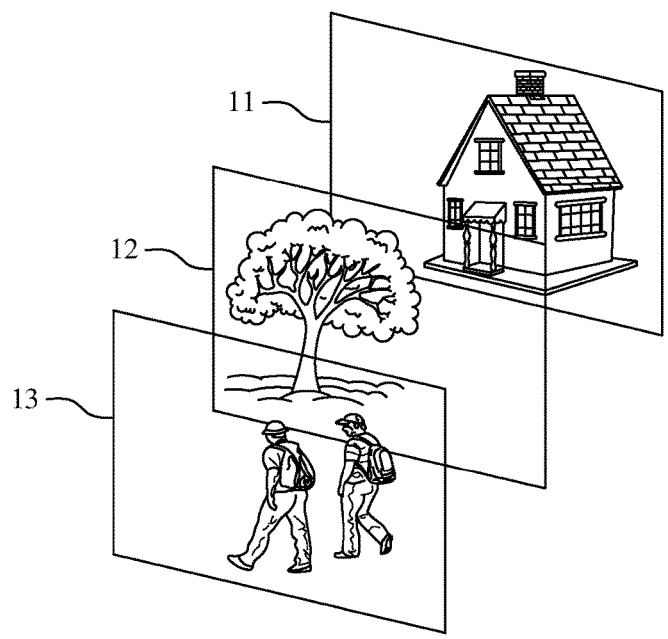
FIG. 1 shows a representation of a multi-plane image, according to a non-limiting embodiment of the present principles.

FIG. 1 shows a representation of a multi-plane image (MPI). In the example of FIG. 1, the MPI is composed of three layers 11, 12 and 13 from the background to the foreground according to a perspective center of projection. The number of layers and the part of the volumetric scene projected onto each layer may vary. For instance, the two characters of layer 13 may be represented in two separate layers. The distances between layers may also vary to be representative of the difference of depth (i.e. distance to the center of projection) of objects represented onto two consecutive layers. The type of projection may differ too. For instance, a panoramic MPI would be represented as concentric cylinders. A 3600 MPI would be represented as concentric spheres or cubes, for example.

From this sliced representation, it is possible to synthesize any viewpoint located in a limited region around the center of the underlying projection. It can be done making use of efficient algorithms ("reversed" Painter's algorithm) which blend each layer with the proper weights (transparency) starting from the nearest to the furthest. According to the location of the viewpoint, occultations of objects of the background by objects of the foreground may differ, allowing an observer to experience a parallax effect and to perceive the volume of the scene by lightly moving his head.

FIG. 5 shows a representation of a volumetric scene sliced in layers according to a spherical projection. The 3D volumetric scene is automatically sliced in numerous layers. Such layers of a MPI comprise large area entirely transparent. So, it is possible to cluster non completely transparent pixels of each layer and to pack the patch pictures of the clustered pixels into an atlas image.

MPEG-I/MPEG for Immersive Video (MIV) is a standardization work to encode volumetric scenes. In MIV, volumetric scenes are samples of projected parts of the scene (called patches) packed into a large image (called atlas) as described in relation to FIG. 6.

FIG. 6 illustrates the conversion of a video MPI to MIV-like atlases. Such a conversion may be performed by, first, temporally and per-layer 61 . . . 62 aggregating not totally transparent (e.g. alpha component unequal to zero) alpha parts over an intra-period of the video, then cluster these "active" regions, and finally pack them in an atlas 60. Such a way allows for obtaining a temporally stable atlas over an intra-period which makes them video codec-friendly. However, such a representation tends to require bigger atlases than regular MIV atlases. Three main reasons explain such a non-desirable overflow in terms of pixel rate.

A first reason is related to the number of layers considered for the MPI construction. The view synthesis process resulting from an MPI based representation highly depends on this number of slices/layers and the way they are sampled across the 3D space. From a synthesis point of view, the sampling must respect perceptual properties to avoid artifacts such as slices discontinuities. Typically, a 1/z-like sampling (inverse of the distance to the central viewpoint) allows for allocating more slices when close to the central viewpoint (i.e. the origin of the MPI underlying projection) and fewer when further away. It is possible to fix the maximum number of slices N and make use of the scene depth range $[z_{min}, z_{max}]$ to infer an associated sampling law. A linear sampling of 1/z between $z_{min}$ and $z_{max}$ is usually chosen leading to the following quantization law:

$$q^i(z) = (2^N - 1)\frac{\frac{1}{z} - \frac{1}{z_{max}}}{\frac{1}{z_{min}} - \frac{1}{z_{max}}} \text{ i.e., } z^i(q) = \frac{1}{\frac{q}{2^N - 1}\left(\frac{1}{z_{min}} - \frac{1}{z_{max}}\right) + \frac{1}{z_{max}}}$$

A computation of the derivative of this law leads to $$\frac{dz^i}{dq}(q) = -\frac{\left(\frac{1}{z_{min}} - \frac{1}{z_{max}}\right)/(2^N - 1)}{\left[\frac{q}{(2^N - 1)}\left(\frac{1}{z_{min}} - \frac{1}{z_{max}}\right) + \frac{1}{z_{max}}\right]^2}$$

which demonstrates that the distance between two consecutive layers of the associated quantization low explicitly depends on $z_{min}$ which is not desirable. Indeed, a direct numerical application shows that, for $z_{min}$=50, $z_{max}$=100, N=10, z(1022)–z(1023)=0,024 which is overkill since one cannot perceive 2 cm at a distance of 50 m. Such a sampling is then not perceptually founded and may dramatically overestimate the number of layers. In addition to requiring huge storage, such a big number of slices may cause an explosion of the number of patches when building MIV-like atlases. Indeed, the more layers in the MPI, the thinner the slices. The extracted patches are then smaller, much more numerous and with "hard to pack" shapes (see FIG. 6). Such a situation then requires bigger atlases than usual and make the pixel rate higher.

A second reason causing higher pixel rate is related to the "sensitivity" to motion of this representation. Indeed, the way the atlas is created from an MPI requires to per-layer aggregating non-zero alpha regions over an intra-period. If a significative motion occurs during this intra-period, then the aggregated masks of the layers impacted by this motion show big active regions associated to the "trail" of this motion. Due to the layered nature of the MPI, many slices may be impacted (especially for "close" motions) which then requires much more space in the atlas to be packed.

A third reason leading to a pixel rate increase is related to the alpha spreading over the atlas. When the position of 3D surfaces of the scene is badly estimated, the associated alphas (transparency coefficients) tend to leak over multiple layers making these surfaces artificially thicker. A side-effect is that the MPI is overfilled and that the process for building the atlases requires more space for the packing.

According to the present principles, a dynamic mechanism to actively control the pixel rate of the MPI-based atlases with attractive perceptual properties is proposed. Such a mechanism mitigates the overall pixel rate by coupling a perceptually based quantization of the MPI slices and an iterative pixel rate mitigation scheme. The perceptually based quantization allows estimating the optimal number of slices required for an MPI at a given angular resolution (of the underlying projection) and for an expected viewing excursion (i.e. the maximal amount of expected shift from the central viewpoint). It tends to decrease the number of levels when the angular resolution and/or the viewing excursion decrease. The iterative scheme iteratively reduces the MPI angular resolution when/while the required pixel rate is too high. Such a mechanism:

makes it possible to ensure any MPI to fit a target pixel rate because, in combination with the quantization law, decreasing the resolution allows reducing the size of the patches and their number, tends to make the scene smoothly "fuzzy" when motion occurs or bad geometry happens (what may be a source of pixel rate overflow), does not require to discard parts of the scene.

Figure 2:
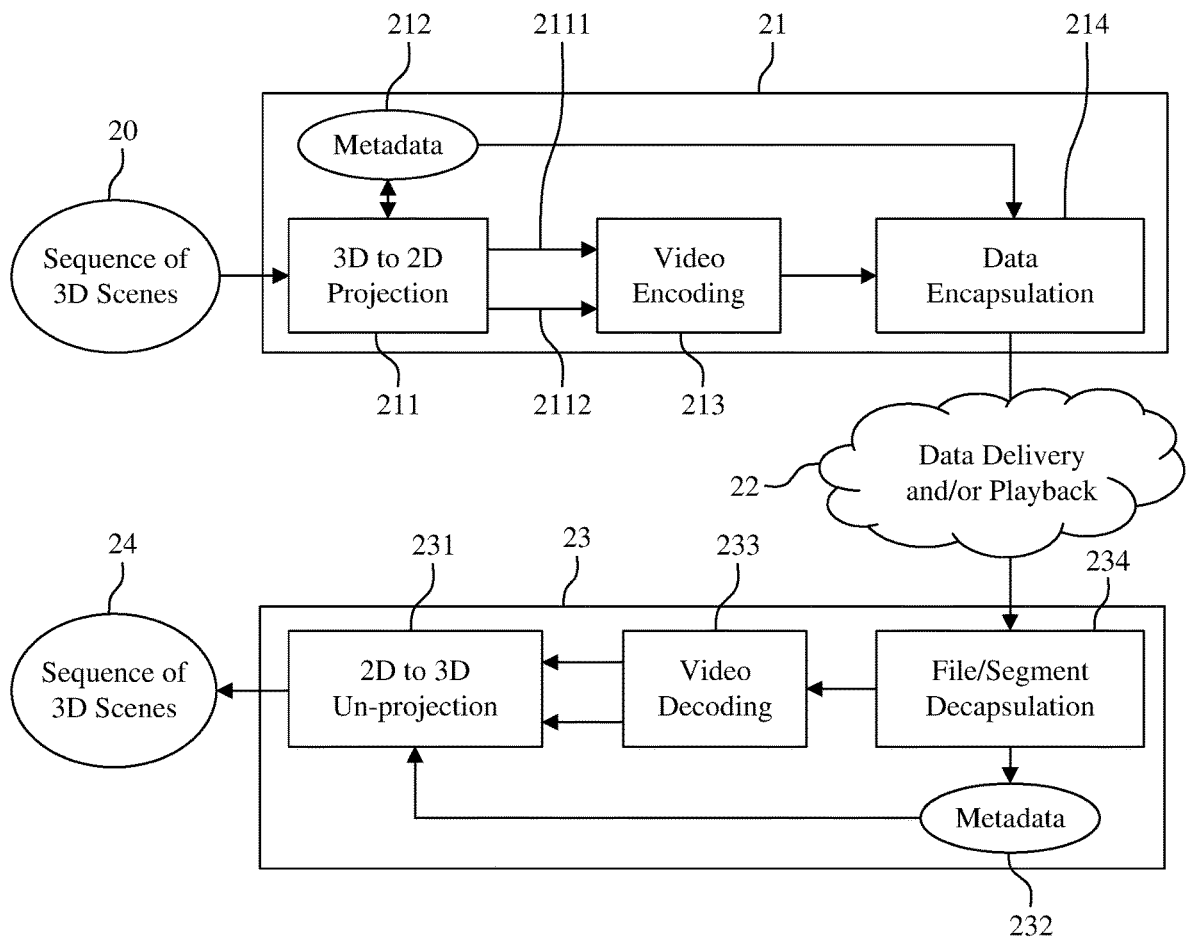
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:
- JPEG, specification ISO/CEI 10918-1 UIT-T Recommendation T.81, https://www.itu.int/rec/T-REC-T.81/en;
- AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en);
- 3D-HEVC (an extension of HEVC whose specification is found at the ITU website, T recommendation, H series, h265, http://www.itu.int/rec/T-REC-H.265-201612-I/en annex G and I);
- VP9 developed by Google; or
- AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:
- a local memory, e.g. a video memory or a RAM (or Random-Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Figure 3:
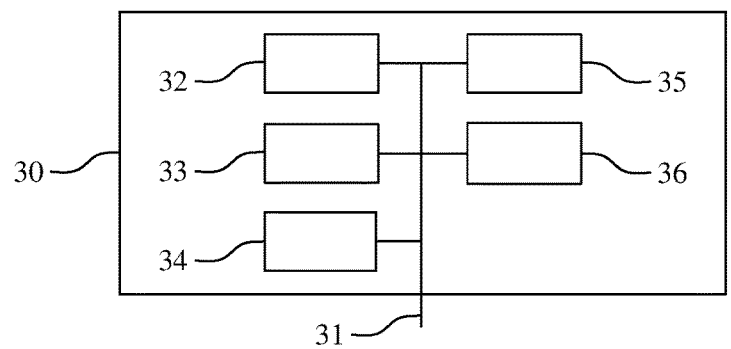
FIG. 3 shows an example architecture of a device which may be configured to implement a method described in relation with FIG. 9, according to a non-limiting embodiment of the present principles.

FIG. 3 shows an example architecture of a device 30 which may be configured to implement a method described in relation with FIG. 9. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word <<register>> used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with 9, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
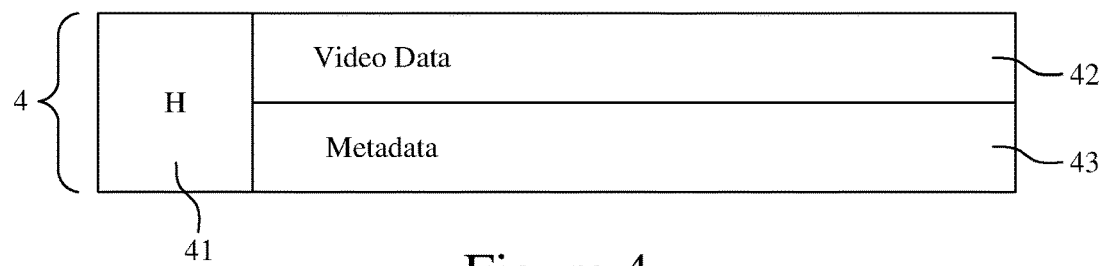
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

FIG. 7 illustrates a perceptually founded quantization law according to a first aspect of the present principles. Such a quantization law is built not to overestimate the number of required levels to build the MPI and to keep this number sufficiently big to ensure good view synthesis.

Such a quantization law also gathers the following properties:
- if the angular resolution (number of pixels per degree) of the MPI is low, then the number of levels is low as well, since the overall image quality decreases and having a low resolution with a big number of levels is counter-intuitive,
- if the expected excursion 71 around the viewing center 72 of the viewing box 73 is small, then the number of levels is small as well, since no large shift from the viewing center may occur and interlayer discontinuities are unlikely to be discovered when synthesizing shifted points of view.

FIG. 7 shows a bidimensional representation of non-zero alpha (i.e. not totally transparent) parts of two consecutive MPI layers 74 and 75 modeling a grazing surface (top view), and a representation of a viewing box 73, i.e. the area of the 3D space from which view synthesis are expected to be performed from this MPI. This area may be characterized by a maximal excursion 71 which is the maximal distance between the MPI center of projection 72 and a possible extremal viewpoint to synthesize. When a MPI is built from an multi-view input, excursion 71 may be equal to half of the baseline of the underlying rig of cameras, that is to say half of the maximal distance between two cameras of the rig (the MPI center being set at the barycenter of the camera positions). Excursion 71 may also be determined by an operator, for instance, content producer following narrative constraints.

In FIG. 7, viewing box 73 is planar for the sake of illustration. The non-zero alpha parts of the two consecutive MPI layers 74 and 75 model a continuous grazing surface, but due to the discretized nature of MPI, this continuous surface is "split" and spread over 2 layers with respect to the underlying MPI layer quantization law. A quantization law according to the resent principles ensures that one should not be able to "perceive" this discretized representation of the continuous grazing surface when shifting along viewing path 73. It is not the case in FIG. 7 as it is possible to cast a ray 76 from the viewing box which goes through two consecutive layers without crossing non-transparent parts 74 and 75. To prevent ray 76 from pass through the discretized surface, for example, layer 74 may be positioned closer to MPI center 72.

FIG. 8 provides technical details on the principles developed in relation to FIG. 7. In FIG. 8, a pixel grid 81 is illustrated. Pixel grid 81 corresponds to a virtual camera sensor associated with the MPI projection. FIG. 8 also illustrates an effect of a central projection: a pixel is not perceived at the same physical size, from the point of view of a user watching at a reconstructed scene, depending on the distance of the projected point from the projection plane. Compared to what was shown in FIG. 7, the physical size of the active parts of the two consecutive layers 84 and 85 capturing the grazing surface is not the same. This size depends on the resolution of the image onto which the 3D scene has been projected to build the MPI. In the example of FIG. 8, this size variation is illustrated by angle 87. FIG. 8 an FIG. 7 are illustrated according to a perspective projection for illustration purposes. The present principles equally apply to any other central projection (the perspective case can even be understood as a "limit case" linearizing the other kind of central mappings).

According to these principles, the position of the active part of layer 84 is set to the size presented in FIG. 8 in order to prevent a ray cast from a point at an excursion distance 82 to go through the slices. According to geometric considerations and using the formalism introduced above, a relation binding $\delta$ (i.e. distance 82), $\theta$ (i.e. angle 87), $z_k$ (i.e. depth of layer 85) and $z_{k+1}$ i.e. depth of layer 84) may be set up:

$$(z_{k+1} - z_k) = \frac{2\tan(\theta)}{\delta} z_k z_{k+1}$$

This former equation is an example of a discretization scheme of the continuous differential equation:

$$z'(q) = \frac{2\tan(\theta)}{\delta} z^2(q)$$

After integration, the following quantization law is provided according to the present principles:

$$z(q) = -\frac{1}{\frac{2\tan(\theta)}{\delta}q - \frac{1}{z_{min}}} \text{ if } z(0) = z_{min}$$

The quantization law proposed according to the present principles:
- has a derivative z' which does not depend on $z_{min}$ or $z_{max}$ but only on the virtual camera angular resolution $$\left(\frac{1}{2\theta}\right)$$

and on the maximal viewing excursion $\delta$,
- is still a $$\frac{1}{z}$$

-like law which ensures that more slices will be allocated when close from the central viewpoint and less when further,
- tends to decrease the number of required levels when the angular resolution and/or the viewing excursion decrease.

A second aspect of the present principles lies in an iterative mechanism allowing an adaptive mitigation of the pixel rate of MPI-based atlases. This mechanism operates per intra-period and adjusts the atlasization properties at a determined rate. According to the present principles, the angular resolution of the underlying central projection used for the construction of the MPI is adapted according to the pixel rate of the atlas. The higher this resolution, the sharper the resulting view synthesis. Decreasing this resolution generates a smoother/fuzzier image with less details (comparable to a camera motion in a non-volumetric video).

At least three phenomena may cause problems for packing patches of an MPI-based atlas for a given number of layers: i) if a motion of the objects of the scene or of the volumetric camera rig occurs, small details of the scene may not be acquired and this information are lost; ii) if the geometry of the scene (e.g. the representation of the scene as a point cloud is not accurate and precise enough, a smoothing of the geometry may be needed to reduce visual artifacts at the rendering side; and iii) if the selected target pixel rate (that is the maximal pixel rate expected to be handled by client devices) is low, the generated volumetric video is meant for low-end application based on low visual quality. The iterative mechanism proposed by the present principles is based on a use of these three phenomena.

The iterative mechanism reduces the projection size, decreases the angular resolution and decreases the number of levels required for the MPI. Indeed, the underlying quantization law described in relation to FIGS. 7 and 8 tends to reduce the number of layers when the resolution decreases. Having less layers leads to less patches to pack in the atlas, which leads to a reduction of the pixel rate.

FIG. 9 illustrates a method 90 for generating a sequence of MPI-based atlases representative of a volumetric video.

At step 91, the mechanism is initialized for an intra-period of the video (i.e. a sequence of frames of the video of a size depending on the CODEC used to encode and compress the sequence of frames). The intra-period may comprise a single frame. A target pixel rate (i.e. the size of the atlas images to generate) is selected. In a variant, the target pixel rate is selected once for the video and remains the same for every intra-period. A resolution for the MPI-based atlas (i.e. an angular resolution for the underlying central projection) is selected for the current intra-period. In an embodiment, if the volumetric scene is built from a multi-view input, this first resolution may be the average or maximal resolution of the associated set of cameras.

At a step 92, the MPI-based patches are generated at this resolution for the entire intra-period of the video by using a quantization law according to the present principles as described in relation to FIGS. 7 and 8. The method is testing whether generated patches fit (i.e. may be packed) in an atlas of the target size. If generated patches do not fit in the atlas (e.g. because they are too numerous or cannot be arranged to be packed), step 93 is performed. Otherwise, if generated patches fit the atlas, step 94 is performed.

At step 93, the angular resolution is decreased and step 92 is iterated. For example, the new angular resolution is proportional to the current angular resolution ($res_{next} = \alpha \cdot res_{previous}$ with $\alpha=0.75$ or $\alpha=0.80$ for instance). Smoothly decreasing the angular resolution and using a quantization law depending on this angular resolution allows visually smooth changes when synthesizing from MPI-based atlases with time-varying resolutions.

At step 94, the sequence of generated atlases in stored in a non-transitory medium. The next intra-period is considered and the method is iterated up to the end of the video.

Dynamically changing the parameters of the transport projections requires to signal these parameters in the metadata bitstream, for example in association with the related camera parameters. In the example of MIV standard, the camera parameters are signaled within an Common Atlas Structure Frame (CAF) structure. At the beginning of the bitstream, the intrinsic and extrinsic camera parameters are initialized with the miv_view_params_list( ) structure. Then, these parameters, either intrinsic, extrinsic, or both, can be updated at any time by resending a CAF embedding either one of the syntax structures miv_view_params_update_intrinsics( ), miv_view_carams_update_extrinsics( ), or both.

A possible syntax to signal changing parameters of the iterative angular resolution adaptation according to the present principles may be the following syntax:

| | Descriptor |
|---|---|
| camera_intrinsics( v, mode ) { | |
|   ci_cam_type[ v ] | u(8) |
|   ci_projection_plane_width_minus1[ v ] | u(16) |
|   ci_projection_plane_height_minus1[ v ] | u(16) |
|   if( ci_cam_type[ v ] == 0 ) { /* equirectangular*/ | |
|     ci_erp_phi_min[ v ] | fl(32) |
|     ci_erp_phi_max[ v ] | fl(32) |
|     ci_erp_theta_min[ v ] | fl(32) |
|     ci_erp_theta_max[ v ] | fl(32) |
|   } else if( ci_cam_type[ v ] == 1 ) { /* perspective */ | |
|     ci_perspective_focal_hor[ v ] | fl(32) |
|     ci_perspective_focal_ver[ v ] | fl(32) |
|     ci_perspective_center_hor[ v ] | fl(32) |
|     ci_perspective_center_ver[ v ] | fl(32) |
|   } else if( ci_cam_type[v] == 2 ) { /* orthographic */ | |
|     ci_ortho_width[ v ] | fl(32) |
|     ci_ortho_height[ v ] | fl(32) |
|   } | |
| } | |

In a variant, parameters describing the quantization law used at step 92 may be stored in header metadata of the data stream.

In another embodiment, the iterative resolution adaptation may be envisioned in a regular MIV encoding process. In this case and very similarly, new synthesis of transport views at lower resolution should have to be done at each intra-period in case of pixel rate limit overshoot.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
generating patches by aggregating not totally transparent parts of a multi-plane image and by using a quantization law depending on an angular resolution, wherein the multi-plane image comprises a number of layers and is representative of a three-dimensional scene;
determining that the generated patches cannot be packed in an atlas image of a given size; and
responsive to the determining, decreasing the angular resolution and repeating generating patches.

2. The method of claim 1, wherein the quantization law requires a lower number of layers of the multi-plane image when the angular resolution decreases or a viewing excursion decreases.

3. The method of claim 1, wherein the quantization law further depends on a viewing excursion associated with the three-dimensional scene.

4. A method for generating a sequence of atlas images from a sequence of multi-plane images according to claim 1, wherein the generated sequence of atlas images is encoded as an intra-period of a video stream.

5. A device comprising a processor configured to perform:
generating patches by aggregating non totally transparent parts of a multi-plane image and by using a quantization law depending on an angular resolution, wherein the multi-plane image comprises a number of layers and is representative of a three-dimensional scene;
determining that the generated patches cannot be packed in an atlas image of a given size; and
responsive to the determining, decreasing the angular resolution and repeating generating patches.

6. The device of claim 5, wherein the quantization law requires a lower number of layers of the multi-plane image when the angular resolution decreases or a viewing excursion decreases.

7. The device of claim 5, wherein the quantization law further depends on a viewing excursion associated with the three-dimensional scene.

8. A device comprising a processor configured to perform generating a sequence of atlas images from a sequence of multi-plane images according to the method of claim 1, wherein the generated sequence of atlas images is encoded as an intra-period of a video stream.

9. The method of claim 4, wherein the quantization law further depends on a viewing excursion associated with the three-dimensional scene.

10. The method of claim 4, wherein the quantization law requires a lower number of layers of the multi-plane image when the angular resolution decreases or a viewing excursion decreases.

11. The device of claim 8, wherein the quantization law requires a lower number of layers of the multi-plane image when the angular resolution decreases or a viewing excursion decreases.

12. The device of claim 8, wherein the quantization law further depends on a viewing excursion associated with the three-dimensional scene.

* * * * *